United States
Hirata et al.

[11] 4,351,590
[45] Sep. 28, 1982

[54] MOTION PICTURE CAMERA WITH AUTOMATIC FOCUSING DEVICE

[75] Inventors: Noritsugu Hirata, Yokohama; Masamichi Toyama, Machida; Hideto Iwama, Kawasaki; Hidekazu Okajima, Naka; Akimasa Nishimura, Kawasaki, all of Japan

[73] Assignee: Canon Kabushiki Kaisha, Tokyo, Japan

[21] Appl. No.: 196,441

[22] Filed: Oct. 14, 1980

[30] Foreign Application Priority Data

Oct. 16, 1979 [JP] Japan .................................. 54-133409
Dec. 11, 1979 [JP] Japan .................................. 54-161017

[51] Int. Cl.³ .............................................. G03B 3/00
[52] U.S. Cl. ....................................... 352/140; 354/25
[58] Field of Search ............... 352/139, 140; 354/25 A

[56] References Cited

U.S. PATENT DOCUMENTS

| | | | |
|---|---|---|---|
| 4,032,934 | 6/1977 | Hendrickson et al. | 352/140 |
| 4,103,309 | 7/1978 | Massa | 352/140 |
| 4,123,765 | 10/1978 | Isono | 352/140 |
| 4,278,340 | 7/1981 | Toyama et al. | 352/140 |
| 4,294,531 | 10/1981 | Shenk | 352/140 |

*Primary Examiner*—Monroe H. Hayes
*Attorney, Agent, or Firm*—Toren, McGeady & Stanger

[57] ABSTRACT

A motion picture camera provided with an automatic focusing device is arranged to have an image of light emitted from an infrared ray emitting diode projected toward an object to be photographed, and to detect an in-focus state by detecting a peak value of output voltage from a light sensitive element as the direction of the emitted light is varied by a rotatable distance measuring cam. The automatic focusing device is adapted for a zoom lens assembly and is arranged to drive an imaging lens, supported by a shaft which is guided by plate shaped masks at both ends of the lens assembly, in the direction of the lens optical axis. The force for driving the imaging lens is kept low, so that the imaging lens can be accurately adjusted by a rotatable focusing cam during a focusing operation. The rotational position of the distance measuring cam, and that of the focusing cam, are provided in the form of resistance values which vary according to the cam lifts, or in the form of digital codes. When digital codes are employed, distance intervals are established so that the depth of field at each interval overlaps an adjacent interval. Satisfactory focusing thus is provided for all distances within any measured interval.

6 Claims, 11 Drawing Figures

OUTWARD MOVING EXTENT S(mm)

FIG. 9

MOTION PICTURE CAMERA WITH AUTOMATIC FOCUSING DEVICE

BACKGROUND OF THE INVENTION

1. Field of the Invention

The present invention relates to a motion picture camera including an automatic focusing mechanism having a high degree of precision.

2. Description of the Prior Art

As disclosed in U.S. Pat. No. 3,836,772, motion picture cameras of the type having an automatic focusing device have, until now, been arranged to provide an in-focus signal as a result of a computation based on the outputs of detection arrays, one of which represents a fixed image formed in a fixed visual field within a distance measuring module, and the other a movable image formed by scanning of a movable optical scanning member. The illumination of each of the fixed and movable images provided by the arrays depends n the brightness of the object to be photographed. With low object brightness, therefore, the distance measuring accuracy decreases due to a drop in the output of the detecting arrays.

In a motion picture camera, the minimum allowable diameter of a scattering circle on a focal plane is smaller than that for a still picture camera, while the depth of focus for a motion picture camera is shallow because its focal lens length is relatively long. When the aperture opens due to lower brightness, the depth of focus becomes extremely shallow. Accordingly, despite the need for highly accurate distance adjustment, it has hardly been possible to adequately perform an automatic focusing operation with the conventional motion picture camera.

In addition to the above problem, the imaging lens of the conventional automatic focusing motion picture camera has been supported and guided by a so-called helicoid arrangement. Lubricating oil used for this helicoid arrangement has a viscosity which is temperature dependent. Under low temperature conditions, therefore, the amount of time required for focusing is prolonged.

SUMMARY OF THE INVENTION

It is an object of the invention to provide a motion picture camera which has a high degree of distance measuring accuracy and excellent operability, and which can be manufactured at a lower cost.

It is another object of the invention to provide a motion picture camera including a focusing mechanism for an imaging lens and an optical system carrying arrangement which requires only a small driving force for driving the imaging lens in the optical axis direction and ensures that the imaging lens driving force for focusing is less affected by variations of temperature, or the like.

In an embodiment of the invention, an image of a light emitting body of an infrared ray emitting diode is projected from the camera body toward an object to be photographed; and an in-focus state is detected by detecting the maximum value of an output voltage obtained from a light sensitive element. This arrangement eliminates the dependency of distance measuring accuracy upon the brightness of an object to be photographed, so that a high degree of distance measuring accuracy can be obtained even when the brightness is low.

In accordance with the present invention, the rotation phase of a distance measuring cam and that of a focusing cam are obtained either as functional value of resistance or as digital codes corresponding to the cam lift. Further, where digital codes are used, sampling intervals are set in such a manner that the depth of field of one sampling interval overlaps that of another sampling interval adjacent thereto, so that out-of focus adjustment can be avoided.

These and further objects, features and advantages of the invention will become apparent from the following description of an embodiment thereof taken in connection with the accompanying drawings.

DESCRIPTION OF PREFERRED EMBODIMENT

Figure 1:
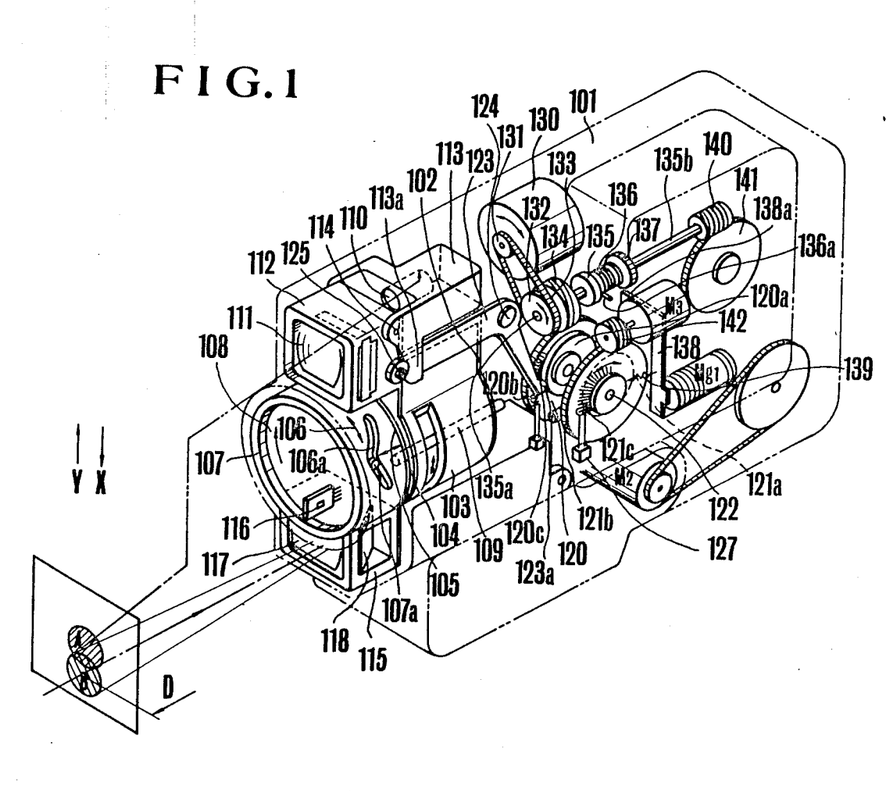
FIG. 1 is an oblique view showing a motion picture camera having an automatic focusing device as an embodiment of the present invention.

In FIG. 1 which is an oblique view showing a motion picture camera with an automatic focusing device as an embodiment of the invention, there are shown a motion picture camera body 101; a zoom base plate 102 which is secured to the camera body 101 and is arranged to form a zoom optical system carrying frame jointly with a zoom fixing lens barrel 103 and a zoom mask plate 104; a front lens cam ring 106 which is secured to a front lens carrying plate 105 and is provided with a cam groove 106a; and a front lens carrying frame 107 which is fitted on the front lens cam ring 106 and is arranged to carry a focusing lens 108. The above stated cam groove 106a is arranged to restrict the displacement of the focusing (or imaging) lens 108 for the purpose of correcting a change of a focal plane that results from a power varying operation of a variable power lens which is not shown. There is provided a focusing guide shaft 109 which is secured to the above stated front lens carrying plate 105 and extends in parallel with the optical axis to be guided by the above stated zoom mask plate 104 and the zoom base plate 102. The guide shaft 109 is urged by a spring which is not shown to move toward a film along the optical axis.

There is provided an infrared ray emitting diode 110 which is disposed within a holder 113 pivotally carried by a rotation shaft 114. A light projecting lens 111 which is arranged to project an image A of the light emitting face of the infrared ray emitting diode 110 toward an object to be photographed is carried by a light projecting lens holding frame 112 which is secured to the zoom mask plate 104. A light sensitive element 116, a mirror 118 and a lens 117 are carried by a holder 115. The light sensitive element 116 is also secured to the mask plate 104. A distance measuring gear 120 and a focusing gear 121 are pivotally held on a rotation shaft 122 secured to the camera body 101 and are arranged to be rotatable independently of each other. These gears 120 and 121 are respectively provided with cam parts 120a and 121a which are arranged coaxially with these gears. Meanwhile, gear parts 120b and 121b are provided on the outer circumference of these gears 120 and 121. A control arm 123 is pivotally held by a shaft 124 secured to the camera body 101 and is arranged to be freely rotatable on the shaft 124. The control arm 123 is formed into an L shape and has an adjusting member 125 secured to one end thereof while the other end of the control arm 123 is pressed by an urging force of a spring which is not shown into contact with the above stated distance measuring cam 120a. Accordingly, the control arm 123 swings on the shaft 124 as the cam 120a rotates.

The above stated adjusting member 125 abuts a cam face formed at an end part 113a of the above stated holder 113. Therefore, when the control arm 123 which abuts the cam 120a rotates clockwise as shown in FIG. 1, the diode holder 113 turns counterclockwise to have the image A of the light emitting part of the diode 110 moved in the direction of an arrow X in a scanning manner. Conversely, when the control arm 123 rotates clockwise, the scanning of the image A is effected in the direction of an arrow Y. In this instance, the relation of the image A to the cam lift of the cam 120a is arranged such that the image A approaches to the light measuring field of the light sensitive element 116 while distance D increases. Further, since the above stated focusing guide shaft 109 abuts on the cam face of the focusing cam 121a, the shaft 109 displaces the imaging lens 108 in the direction of the optical axis thereof as the cam 121a rotates. Distance adjustment is accomplished in this manner. In other words, the imaging lens is moved outward for adjustment to a shorter distance and is moved inward for adjustment to a longer distance or toward infinity.

A film driving motor 130 is arranged to drive also the infrared ray emitting diode holder 113. The output shaft of the motor 130 is provided with a pinion gear 131. A follower gear 132 is driven in the direction of an arrow shown in the drawing through a timing belt 133. A worm gear 134 which is arranged into one unified body with the follower gear 132 through a shaft 135a is arranged to engage the above stated gear part 120b of the distance measuring gear 120. The rotation of the motor 130 causes the cam 120a to rotate. Therefore, the above stated diode holder 113 is swung thereby. A toothed wheel 137 which is arranged to move in association with a film feeding mechanism and a shutter mechanism and a worm 140 which engages a film wind-up gear 141 are secured to a shaft 135b which is arranged to be concentrically rotatable with the above stated shaft 135a. The toothed wheel 137 and the worm 134 are arranged to be engaged and disengaged by a spring clutch.

Figure 2:
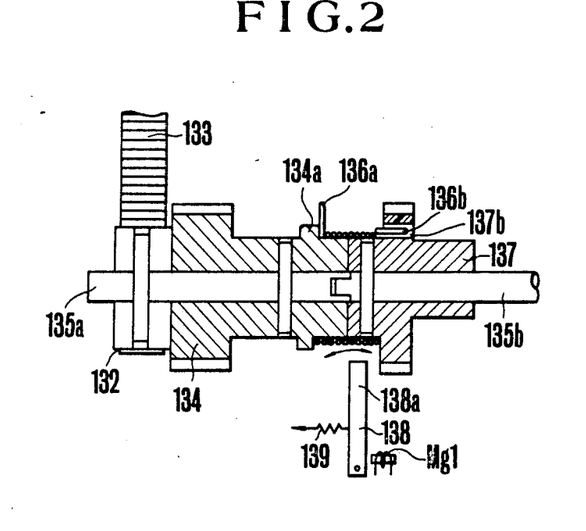
FIG. 2 is a sectional view showing the embodiment shown in FIG. 1 including the shaft of a spring clutch.

FIG. 2 is a sectional view in which the shaft of the above stated clutch is shown. Referring to FIG. 2, a coil spring 136 for the spring clutch is wound round the shanks of equal diameter of the worm 134 and the toothed wheel 137. One end 136a of the spring 136 extends in the radial direction thereof while the other end 136b extends in the axial direction to be inserted in a hole 137b provided in the toothed wheel 137. A flange part 134a is provided for the purpose of restricting the movement of the spring 136. There is provided an armature of an electromagnet Mg1 shown in FIG. 1. When the electromagnet Mg1 is not excited, the armature 138 is pulled by a spring 139 and is thus located within a locus of one end 136a of the spring 136. When the electromagnet Mg1 is excited, the armature 138 is attracted thereby and moves to a position outside of the above stated locus. Such being the structural arrangement, when the film driving motor 130 rotates in the direction of the arrow shown in FIG. 1, while one end 136a of the spring 136 is in engagement with the armature 138, the winding diameter thereof is enlarged. Therefore, the rotatin of the worm 134 is not transmitted to the toothed wheel 137 but is transmitted solely to the distance measuring gear 120. This causes the diode holder 113 to swing on the shaft 114 through the control lever 123. However, in the meantime, the shutter mechanism and the film feeding mechanism remain undriven.

On the other hand, when the electromagnet Mg1 is excited, the end part 138a of the above stated armature 138 retracts out of the rotation locus of the end 136a of the spring 136 as mentioned in the foregoing. Then, the driving force of the driving motor 130 is transmitted not only to the gear 120 but also to the gear 137. Then, a shutter and a feeding claw arrangement which are not shown are driven. A wind-up claw arrangement is driven by a wind-up worm gear 140 and a wheel 141 to transport the film through a known process. Thus, in accordance with the embodiment of the invention, the force of the motor for film driving can be used not only for film feeding but also for scanning operation on the distance measuring optical system. Besides, it is highly advantageous that the shutter operation and the film feeding can be started concurrently with completion of a focusing operation and that shutter blades are arranged to come to a stop in their closing positions without fail.

There is provided a focusing motor M3. A worm 129 which is secured to the output shaft of the motor M3 engages the above stated gear 121. The motor M3 is rotated in the normal or reverse direction to carry out a focusing operation by moving the carrying plate 105, the cam ring 106 and the front lens carrying frame 107 forward or backward in the direction of the optical axis. The front lens carrying frame 107 is arranged to rotate within the cam ring in association with a power varying operation and to move in the direction of the optical axis in accordance with the cam groove 106a in such a manner that the change in the focal plane resulting from the power varying operation is corrected by this arrangement of the front lens carrying frame 107.

When the projected light A from the light emitting diode 110 coincides, on the object to be photographed, with the light receiving range B of the light sensitive element, a circuit which will be described hereinafter causes the focusing motor M3 to rotate to carry out a focusing operation. Upon completion of the focusing operation, the electromagnet Mg1 is excited. The armature 138 is attracted by this and moves away from the locus of the end 136a of the spring 136. Then, the spring 136 rotates together with the worm 134 in close contact with the shank of the worm 134. The shutter operation and film feeding are accomplished with a rotating force transmitted to the toothed wheel 137 by the tightening force of the spring 136.

Figure 3:
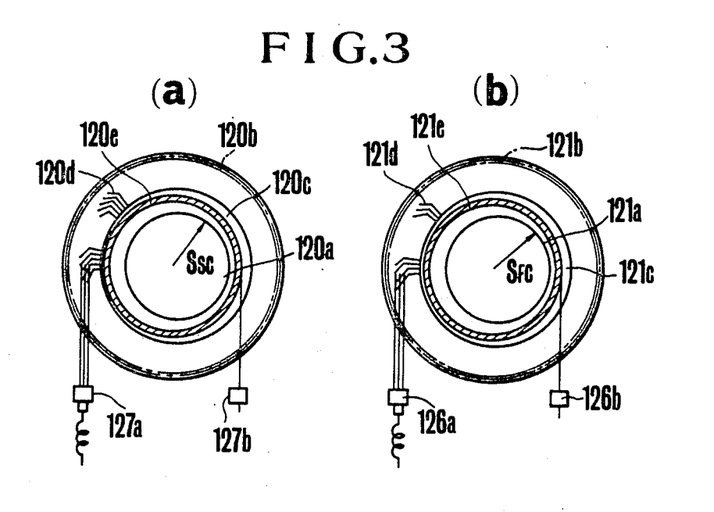
FIGS. 3(a) and 3(b) are illustrations showing a scanning cam and a focusing cam each being shown as in a state of having a resistor stuck thereto.

As shown by way of example in FIGS. 3(a) and 3(b), the gears 120 and 121 are provided with functional resistors which have resistance values corresponding to the cam lifts in a one-to-one relation thereto. In FIG. 3(a) are shown a functional resistor 120c; comb-teeth shaped metal electrodes 120d; a ring-shaped metal electrode 120e; and brushes 127a and 127b which come into sliding contact with the electrodes 120d and 120e and are arranged to tap off a resistance value which corresponds to the cam lift Ssc in a one-to-one relation thereto. In the case of the focusing gear which is shown in FIG. 3(b), there are also provided a similar functional resistor 121c and metal electrodes 121d and 121e, while brushes 126a and 126b are also arranged to tap off a resistance value that corresponds to the cam lift Sfc in a one-to-one relation thereto.

Figure 4:
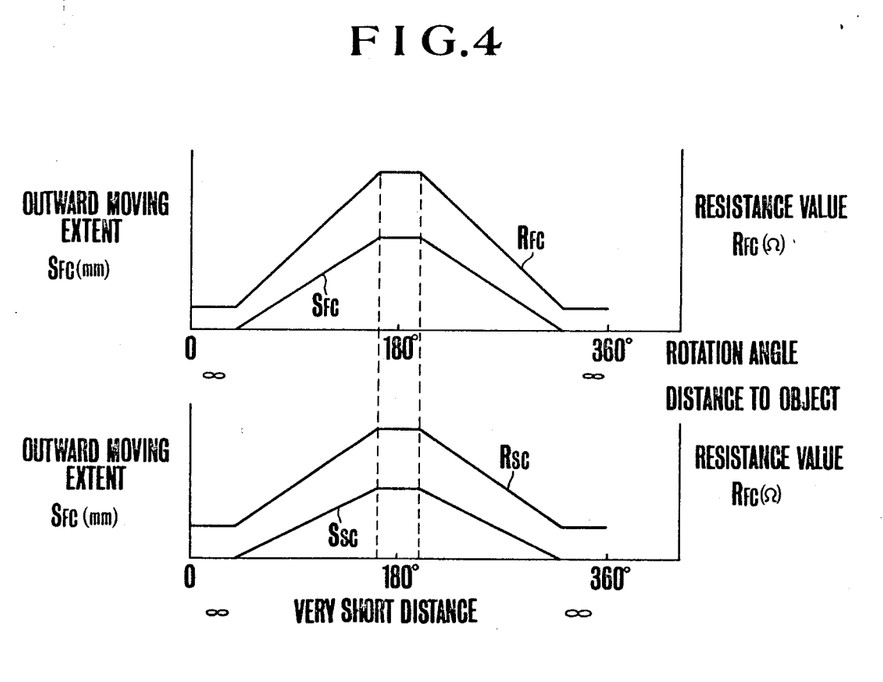
FIG. 4 is a graphic representation showing the relation of the resistance values to the cam lifts of the focusing cam and the scanning cam in the same embodiment of the invention.

FIG. 4 is a graphic representation showing the relation of the above stated cams 120a and 121a to the resistance values. The resistance value Rfc corresponding to the cam lift Sfc of the cam 121a and the resistance value Rsc corresponding to the cam lift Ssc of the cam 120a respectively correspond in a one-to-one relation thereto.

Accordingly, with the cam lifts and resistance values Sfc, Rfc, Ssc and Rsc respectively set at predetermined values, a distance measuring operation is started concurrently with the start of rotation of the cam 120a; the resistance value Rsc at the moment when an in-focus signal is obtained by a circuit (which will be described hereinafter) is read out and a sample holding action is performed; at the same time, the difference of this from the resistance value Rfc corresponding to the position of the imaging lens at that moment is discriminated; and the focusing motor M3 is rotated in the normal or reverse direction to have the gear 121 rotated thereby to move the imaging lens 108 until there exists a relation of Rsc=Rfc. An automatic focusing operation is performed in this manner.

Figure 5:
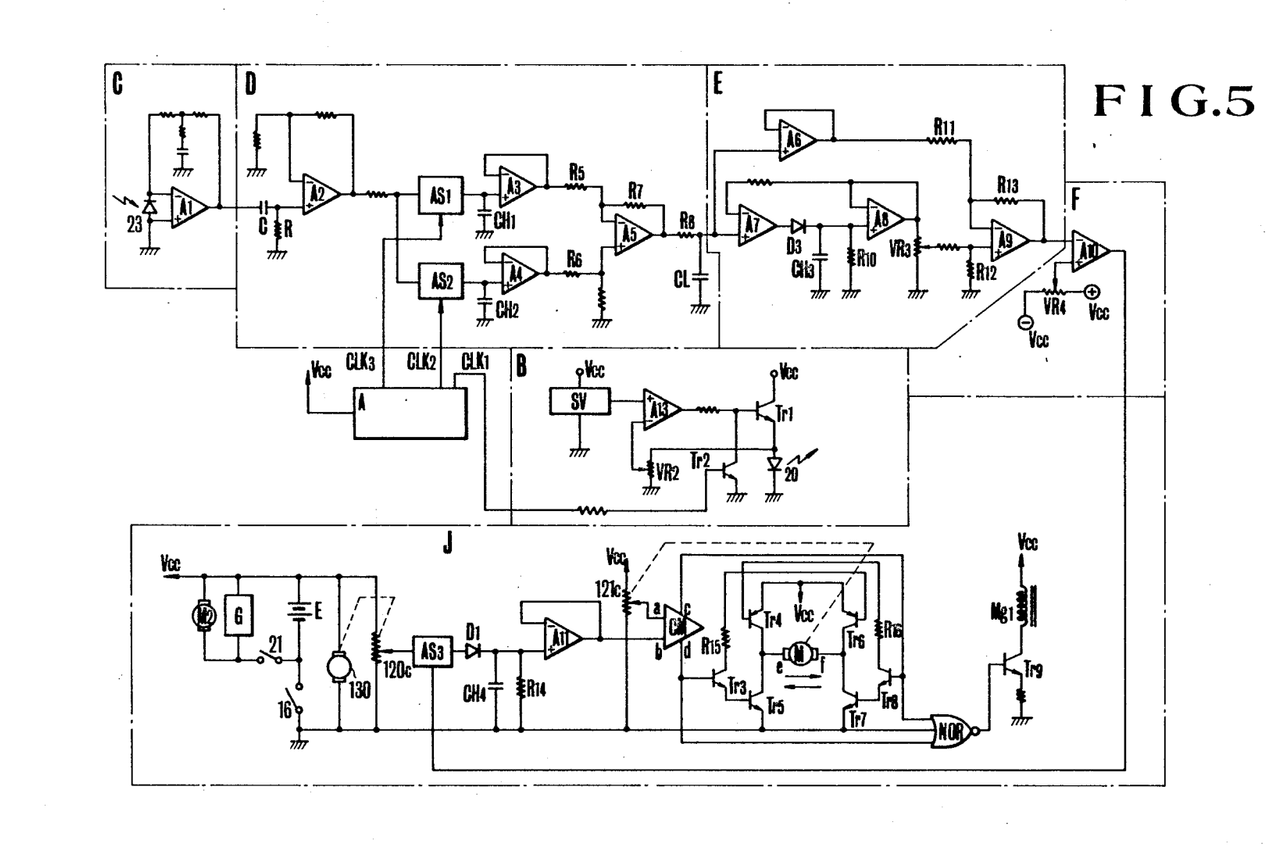
FIG. 5 is a circuit diagram showing by way of example a distance measuring circuit, a control circuit for a motor, etc. provided in the same embodiment.

FIG. 5 shows by way of example a control circuit of a camera to which the present invention is applied. The control circuit comprises an oscillation circuit A, a light emitting diode driving circuit B, a silicon photo-cell amplification circuit C, a sample hold circuit D, a peak detecting circuit E, a level detecting circuit F, an exposure control circuit G and a motor servo control circuit J.

The oscillation circuit A is arranged to receive a power supply of voltage Vcc from a power source through a switch 16 which is brought into a closed state as will be described hereinafter by a second step in a depressing or actuating operation on a release button which is not shown. The oscillation circuit A produces signals CLK1–CLK3 of different phases and of a predetermined frequency, such as 10 KHz. The phases of the signals CLK2 and CLK3 differ from each other by 180° while the phase of the signal CLK1 is arranged to be the same as that of either the signal CLK2 of the signal CLK3.

The light emitting diode driving circuit B is composed of a constant voltage circuit SV, a voltage level detecting operational amplifier A13, a voltage setting variable resistor VR2, and transistors Tr1 and Tr2. The base input terminal of the transistor Tr2 is connected to the above stated signal CLK1 producing output terminal CLK1 of the oscillation circuit A through a resistor. The potential of divided voltage obtained by the variable resistor VR2 is set to be smaller than the output of the constant voltage circuit SV. Therefore, the base input terminal of the transistor Tr1 has a high level signal (hereinafter will be called an H level signal) applied thereon when the above stated switch 16 is in a turned-on state. With the H level signal applied, the transistor Tr1 is turned on to cause the light emitting diode 20 to emit light.

Under this condition, when the signal CLK1 from the output terminal CLK1 of the oscillation circuit A is supplied to the transistor Tr2, the transistor Tr2 is turned on and off according to the signal. Then, in response to this, the other transistor Tr1 is also turned on and off. Therefore, the light emitting diode 20 is arranged to be turned on and off in synchronism with the output signal CLK1 of the oscillation circuit A.

The silicon photo-cell (SPC) amplification circuit C is composed of a silicon photo-cell (SPC) which is employed as a light sensitive element; an operational amplifier A1, resistors and a capacitor which constitute a low pass filter. This low pass filter is arranged to reject a high frequency component exceeding the oscillation frequency of the above stated oscillation circuit A.

A light signal which is received at the SPC 23 is amplified as an electrical signal at the operational amplifier and is produced from the circuit C.

The sample hold circuit D and the peak detecting circuit E are composed of operational amplifiers A2–A9, a high pass filter formed by a resistor R and a capacitor C, analog switches AS1 and AS2 which are energized and controlled by the H level signals from the output terminals CLK2 and CLK3 of the oscillation circuit, sample holding capacitors CH1–CH3, resistors R5–R13 and VR3, and a smoothing capacitor CL.

Since the phase of the output CLK2 of the oscillation circuit A differs 180° from that of the output CLK3 as mentioned in the foregoing, the analog switches AS1 and AS2 are alternately energized in synchronism with the turning on and off of the light emitting diode 20. Therefore, after the amplified output of the SPC 23 is supplied to the sample hold circuit D, the output of the SPC 23 passes through the high pass filter and further undergoes inversion amplification by the operational amplifer A2. The output of the SPC 23 is then divided into small parts by the analog switches AS1 and AS2 in a time-sharing manner to be held at the capacitors CH1 and CH2. The outputs which are thus held are compared at the operational amplifier A5. With this arrangement, information on the brightness of the background of an object to be photographed is excluded from the output of the SPC 23 and eventually it is solely a reflection light of the light projected from the diode that is produced as the output of the operational amplifier A5.

The signal thus obtained is smoothened by the resistor R8 and the capacitor CL and then is supplied to the non-inversion input terminal of an operational amplifier A7. The signal which then increases and fluctuates due to the actions of the capacitor CH3 and a diode D3 is held for a while. When the changes of the output of the SPC 23 pass the peak thereof and begin a trend downward, discharge of capacitor CH3 begins at a predetermined discharge time constant through the discharge route of the resistor R10. Then, a peak value is retained over a predetermined length of time by suitably setting this discharge time constant.

Meanwhile, after voltage dividing by the variable resistor VR3, the amplification output of the operational amplifier A8 is applied to the non-inversion input terminal of the operational amplifier A9. Since, in the meantime, the operational amplifier A9 is arranged to have the DC component of the output signal of the SPC 23 applied to the inversion input terminal thereof through a resistor R11 and an operational amplifier A6 which forms a buffer, if the time constant of the above stated resistor R10 and the capacitor CH3 is sufficiently great, the levels of both inputs of the operational amplifier A9 will coincide with each other a given length of time after the output of the SPC 23 has passed the peak value thereof. Further, until then, the inversion input of the operational amplifier A9 is greater than the non-inversion input thereof.

The level detecting circuit F is formed by a comparator A10, and a variable resistor VR4. The circuit F produces an H level signal when the output of the peak detecting circuit E is within a range less than a setting value set by the variable resistor VR4. In other words, the output of the comparator A10 changes from an H level to a low level (hereinafter will be called L level) a short length of time after the output of the above stated SPC 23 has passed the peak value.

The motor servo control circuit includes a film driving motor 130; a sound recording motor M2, a focusing motor M3, exposure control circuit G, transistors Tr3–Tr9, a power source battery E, a switch 21 which is arranged to be turned on by a first step in a depressing or actuating operation on a release button which is not shown; another switch 16 which is arranged to be turned on by the second step of the depressing operation; a resistor 120C which changes its resistance value Rsc in accordance with the phase of rotation of the gear 120 caused by the above stated driving motor M1; an analog switch AS3 which is arranged to become conductive when an H level signal is received at a gate; a diode D1; a sample holding capacitor CH4; a discharge resistor R14; an operational amplifier A11 which forms a buffer; a comparator CM; a resistor 121c which changes its resistance value Rfc in accordance with the phase of rotation of the wheel 121 caused by the above stated focusing motor M3; a three-input logical NOR gate NOR; an electromagnet Mg1; and resistors R15 and R16.

The sound recording motor M2 and the exposure control circuit G are connected in such a way as to be turned on by closing of the switch 21. The film driving motor 130 and both ends of the resistor 120c are arranged to have a voltage Vcc applied to them when the switch 16 is closed. The gate input terminal of the analog switch AS3 is connected to the output terminal of the above stated comparator A10 while the analog switch AS3 is arranged to have a divided voltage of the resistor 120c supplied thereto. The output terminal of the analog switch AS3 is connected to the capacitor CH4 and one end of the resistor R14 through the diode D1 and is also connected to the non-inversion input terminal of the operational amplifier A11. Meanwhile, the other ends of the capacitor CH4 and the resistor R14 are grounded. The output of the operational amplifier A11 is arranged to be fed back to the inversion input terminal of the amplifier while it is also connected to the input terminal b of the comparator CM. The input terminal a of the comparator CM is connected to the voltage dividing point of the above stated resistor 121c. The output terminal c of the comparator CM is connected to the base of the NPN transistor Tr8 and to one input terminal of the NOR gate NOR, while the output terminal d of the comparator CM is connected to the base of the NPN transistor Tr3 and to another input terminal of the NOR gate NOR. The collector of the transistor Tr8 is connected to the base of the PNP transistor Tr4 through the resistor R16. The collector of the transistor Tr3 is connected to the base of the PNP transistor Tr6 through the resistor R15. The emitters of the transistors Tr4 and Tr6 are connected to the power source. Meanwhile, their collectors are connected to the collectors of the NPN transistors Tr5 and Tr7 respectively. The emitters of the transistors Tr5 and Tr7 are grounded. Further, the base of the transistors Tr5 and Tr7 are connected respectively to the emitters of the transistors Tr3 and Tr8. The collectors of the transistors Tr4 and Tr5 are connected to one terminal of the focusing motor M3 while the collectors of the transistors Tr6 and Tr7 are connected to the other terminal of the motor M3. The remaining input terminal of the NOR gate NOR is grounded while the output terminal of the gate is connected to the base of the NPN transistor Tr9. The transistor Tr9 has a voltage Vcc applied to its collector through the electromagnet Mg1. The emitter of the transistor Tr9 is grounded through a resistor.

The structural arrangement being as described in the foregoing, when the switch 21 is turned on by the first step of depression of the release button which is not shown, the sound recording motor M2 and the exposure control circuit G are turned on thereby. Then, with another switch 16 turned on by the second step of depression of the release button, power supply is effected to the focus detecting circuit comprising the circuit units A, B, C, D, E and F and the driving motor M1 begins to rotate. The resistance value Rsc of the resistor 120c then changes in synchronism with the rotation of the motor M1.

With scanning by the driving motor commenced as mentioned in the foregoing, an L level signal is produced from the comparator A10 immediately after the detection by the SPC reaches the peak thereof. Accordingly, the analog switch AS3 is turned off. A current which corresponds to the resistance value Rsc immediately before the arrival of the peak flows to the capacitor CH4 which is provided for sample holding and is stored there. The potential value of this capacitor CH4 is applied to the input terminal b of the comparator CM through the operational amplifier A11 which forms a buffer. Meanwhile, a divided voltage obtained by the resistor 121c which changes its resistance value Rfc in synchronism with the rotation of the focusing motor M3 is applied to the other input terminal a of the comparator CM. Accordingly, the output of the comparator CM causes the focusing motor to keep on driving until the voltage values of the two inputs of the comparator CM coincide with each other. The driving operation of the focusing motor M3 by the output of the comparator CM is as follows:

The voltage values of the voltages impressed on the two input terminals a and b of the comparator CM are compared at the output terminal d of the comparator CM. The comparator CM then produces a signal of an H level or an L level according to the result of comparison. For example, when the potential of the input terminal a is higher than that of the input terminal b, the output from the output terminal c is an H level signal. Accordingly, the transistors Tr8 and Tr7 are turned on. The transistor Tr4 is also turned on. Then, a current flows to the focusing motor M3 from its terminal e to its other terminal f to cause the motor M3 to rotate in the direction of lowering the resistance value Rfc of the resistor 121c.

On the other hand, when the potential of the input terminal b of the comparator CM is higher than that of the input terminal a, the output from the output terminal d becomes of an H level to turn on the transistors Tr3 and Tr5 while the transistor Tr6 is also turned on. This causes a current to flow to the motor M3 from the terminal f thereof to the terminal e to have the motor rotate in the direction of increasing the resistance value Rfc of the resistor 121c. When the potentials of the input terminals a and b become equal to each other, the potentials of both the ouptut terminals c and d become L levels and the motor ceases to drive.

A focusing operation is performed in this manner. The time constant determined by the discharge resistor R14 and the sample holding capacitor CH4 is arranged to be sufficiently small. Therefore, the potential to be held by an in-focus signal at every scanning action is discharged before a next scanning action begins. The sample hold potential is thus reset without fail in preparation for the next scanning action.

Meanwhile, the three input terminals of the logical gate NOR are connected to the ground and to the output terminals c and d of the comparator CM respectively. Therefore, an H level signal is produced from the gate upon completion of a focusing operation. This signal turns on the transistor Tr9 to excite the electromagnet Mg1. With the electromagnet excited, the stopper 138 is displaced to switch over the driving force of the driving motor M1 to be transmitted also to the toothed wheel 137 and the worm 140. This causes the shutter mechanism and the film transport mechanism which are not shown to be driven by the driving motor M1.

Referring now to FIGS. 1 and 5, the whole camera arrangement operates as follows:

The switch 21 is turned on by the first step of depression of the release button which is not shown, as described in the foregoing. This causes the sound recording motor M2 and the exposure control circuit G to be turned on in turn. Following this, the second step of the depression of the release button turns the switch 16 on to effect power supply to the circuit units A, B, C, D, E and F which constitute a focus detecting circuit and, at the same time, the driving motor begins to rotate. The worm 134 is then rotated through the pinion 131 and the belt 133. The worm wheel 120 also rotates. Next, the control lever 123 which is abutting on the cam 120a secured to the worm wheel begins to turn on the shaft 124. Then, the light emitting diode holder 113 which has the cam portion thereof abutting on the other end of the control lever performs scanning on the object to be photographed with a flickering of the light emitting diode 20.

The output of the SPC 23 which is used as a light sensitive element varies in response to this scanning action. Immediately after the peak of the varying output f the SPC 23, i.e. focus position, is detected, the analog switch AS3 shown in FIG. 5 is closed. Then, a voltage corresponding to the resistance value of the resistor 120c which is fixed to the cam 120a is held at the capacitor CH4. This held potential is compared with a divided voltage obtained from the resistance value of the resistor 121c fixed to the focusing cam 121a. The focusing motor is servo driven by the output of a difference obtained by this comparison. The worm wheel 121 for focusing is rotated to change the cam lift of the focusing cam 121a until a predetermined relation exists between the resistance value of the resistor 120c and that of the resistor 121c. Since one end of the guide shaft 109 abuts the circumferential face of the cam 121a, the focusing lens 108 is moved to a position corresponding to a predetermined resistance value of the resistor 120c to complete the focusing operation.

Upon completion of the focusing operation, the electromagnet Mg1 is excited. The armature 138 is displaced to connect the spring clutch 136. The driving force of the motor M1 is then transmitted to the gear 137 and the worm 135b to actuate the film transport mechanism and the shutter mechanism for photographing.

The motor 16 is continuously driven as long as the second step of depression of the release button continues and is thus arranged to periodically perform a scanning action during the photograph taking operation. When the position of the object to be photographed changes to more than a certain given extent, film feeding and shutter operating actions are stopped until a focusing operation is newly performed.

As described in detail in the foregoing, the embodiment of the invention has the following advantageous features:

(1) A light of a light source such as an infrared ray emitting diode is projected from the camera body toward an object to be photographed. Then, a focal point is detected by detecting a maximum value of the output voltage produced from a light sensitive element. Therefore, the distance measuring accuracy is not dependent on the brightness of the object, so that a high degree of distance measuring accuracy can be obtained even when the brightness of the object is low.

(2) In performing distance adjustment, the driving force required for moving an imaging lens in the optical axis direction is small. This driving force is varied only in a minor degree by variations of temperature, so that distance adjustment can always stably and quickly performed.

(3) The scanning and driving cam of the distance measuring optical system is arranged coaxially with the focusing cam. Besides, the distance measuring scanning cam is provided with a functional resistor which is arranged to have its resistance value correspond to the scanning displacement of the distance measuring optical system in a one-to-one relation and is arranged into one unified body with the focusing cam. This arrangement enables performance of signal detection at a high degree of accuracy when an in-focus signal is produced.

Figure 6A:
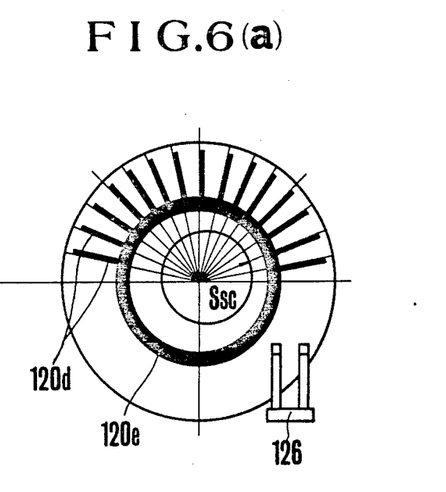
FIGS. 6(a) and 6(b) are schematic illustrations showing by way of example the shapes of digital printed patterns of the present invention.

Referring to FIGS. 6(a) and (b), while, in the foregoing description, the functional resistors are arranged on the sides of the distance measuring gear and the focusing gear to detect their rotation phases as shown in FIGS. 3(a) and (b), the arrangement may be replaced with digital printed patterns which are arranged to perform the same detection as shown in FIGS. 6(a) and (b). These digital patterns are arranged as described below:

In FIG. 6(a), a ring-shaped metal electrode 120e is disposed on a side face of the distance measuring gear 120; and an electrode pattern arrangement 120d is also shown. The pattern electrodes are spaced at intervals which will be described hereinafter. There is provided a sliding piece 126 which is arranged on the camera body to be brought into contact with the ring electrode and the pattern electrodes.

Figure 7A:
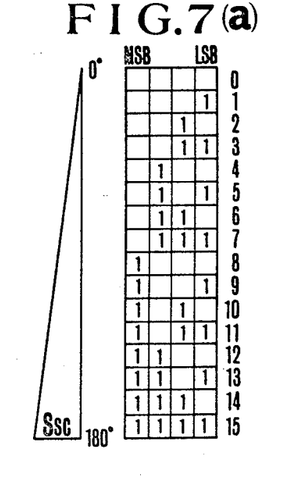
FIGS. 7(a) and 7(b) are illustrations showing the relation of the extents of cam lift to digital signals.

FIG. 7(a) shows the corresponding relation of the rotating phase of the distance measuring cam, the extent of outward movement of a focusing lens and a digital time serial signal corresponding to the rotating phase in this embodiment of the invention.

Figure 6B:
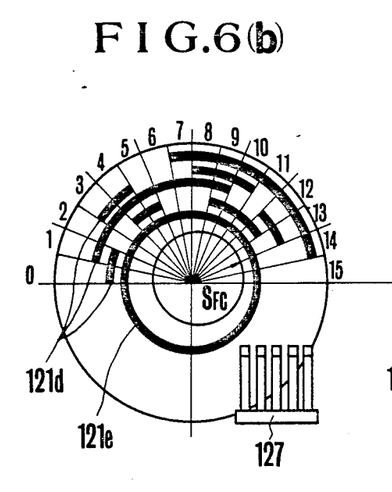

FIG. 6(b) shows an example of a digital code pattern formed on the focusing gear 121. In this example, there are provided a ring shaped metal electrode 121e; and pattern electrodes 121d. The pattern electrodes 121d are arranged to produce gray codes according to the rotating phase of the focusing cam 121a at the same intervals as the above stated pattern electrodes of the distance measuring cam. Meanwhile, there is provided a sliding piece 127 which is arranged on the camera body and is arranged to be brought into contact with the above-stated ring electrode 121e and the pattern electrodes 121d.

Figure 7B:
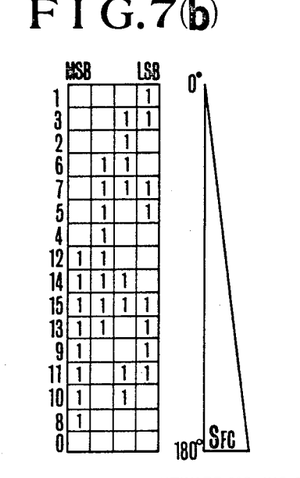

FIG. 7(b) shows the corresponding relation of the rotating phase of the focusing cam, the extent of outward movement of a focusing lens and a digital code signal corresponding to the rotating phase.

Figure 8:
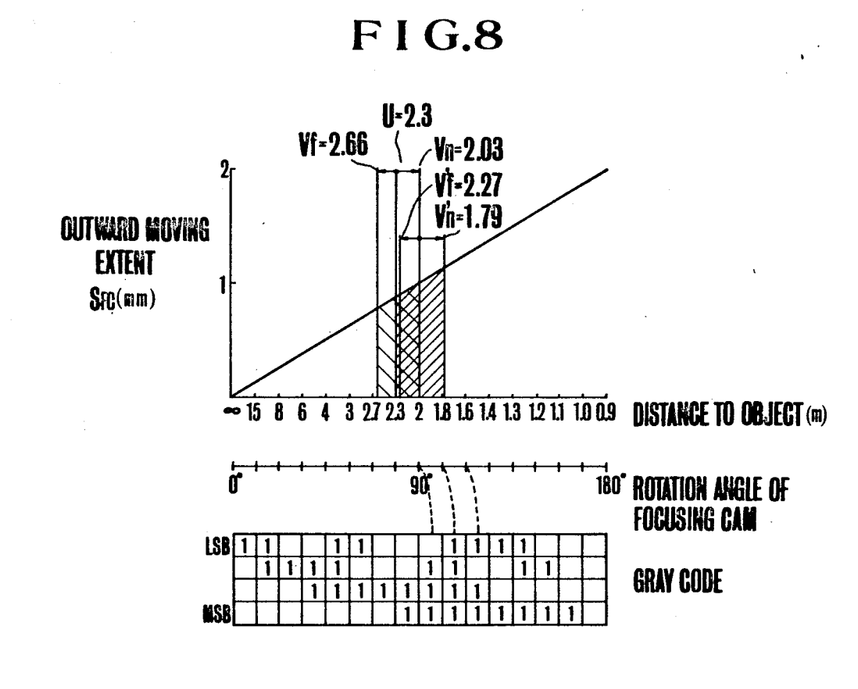
FIG. 8 is an illustration showing the sampling interval setting arrangement for the rotation phase of the focusing cam shown in FIG. 6.

FIG. 8 shows the relation of the extent of outward movement of the focusing lens which is moved outward by the focusing cam 121a, a distance to the object corresponding to the extent of outward movement and the rotating angle of the focusing cam, and also the relation of digital codes to the distance to the object to be photographed with the distance divided into predetermined intervals. As shown, with the aperture of a stop assumed to be F 2.0, for example, the divided distance intervals of the distance is arranged such that the front side of the depth of field of one distance interval overlaps the rear side of the depth of field of another. In a case where the distance to the object is 2 m, for example, the depth on the front side is 1.8 m and the depth on the rear side is 2.3 m. Next, when the distance to the object is 2.3 m, the depth on the front side is 2 m and the depth on the rear side 2.7 m. The rear side depth for the distance of 2 m to the object thus overlaps the front side depth for the distance of 2.3 m to the object.

With the distance to the object arranged to be divided in this manner, the digital code pattern electrodes provided for the focusing cam are divided accordingly and the digital pattern electrodes provided for the distance measuring cam are spaced at intervals corresponding to the above stated divisions of the distance to the object.

Figure 9:
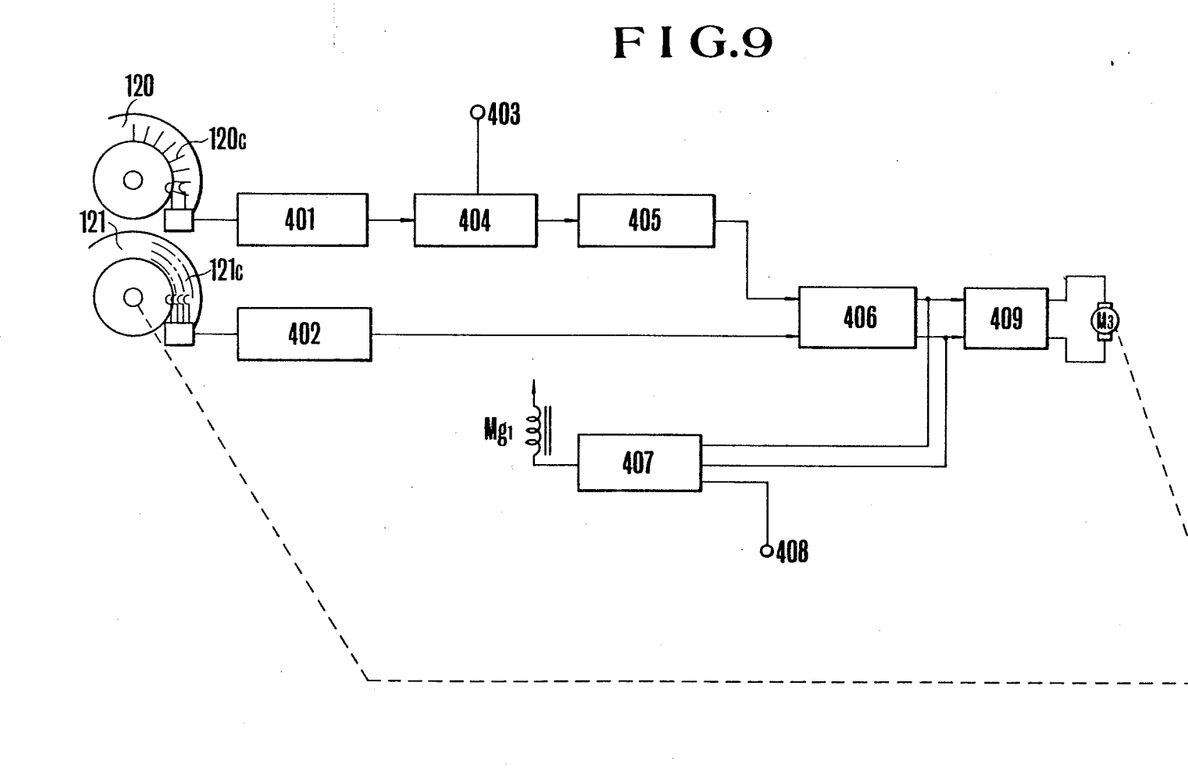
FIG. 9 is a circuit diagram showing a circuit arrangement for processing a digital signal representative of a signal projecting direction and a digital signal representative of the position of an imaging lens.

FIG. 9 is a block diagram showing a circuit for processing the distance measuring pulses of a distance measuring printed pattern 120c and the digital code pulses of a focusing printed pattern 121c arranged in accordance with the present invention. The circuit comprises a binary counter 401 which is arranged to count the above stated distance measuring pulses; a decoder 402 which is arranged to convert the above stated digital code pulses into binary codes; an in-focus signal input terminal 403 which is arranged to receive an in-focus signal from an in-focus point detecting circuit which is not shown, this input terminal being arranged, for example, to receive the output of the comparator A10 shown in FIG. 5; a gate circuit 404 which is rendered conductive when the above stated in-focus signal is applied thereto, this gate circuit being something like the analog switch AS3 used in the embodiment shown in FIG. 5; a register 405 which is arranged to temporarily hold the output value of the above stated binary counter 401; a digital comparator 406 which is arranged to compare the value held at the register 405 with the output of the above stated decoder 402; and a driver circuit 409 which is arranged to allow currents to flow to a focusing cam driving motor M3 in two directions according to the outputs of the comparator 406 which are produced in two directions. The circuit is arranged such that the motor M3 is servo driven until the above stated distance measuring pulses become equal to the binary value of the above stated focusing digital code pulses.

The processing circuit further includes a gate circuit 407 which is something like the NOR gate shown in FIG. 5. The gate circuit 407 takes a logical product to energize the above stated electromagnet Mg1 when both the two outputs of the above stated digital comparator 406 are of L levels while a release-on signal from a release signal input terminal 408 of the motion picture camera is applied to the gate circuit.

In this embodiment, as described in the foregoing, two rotating cams are arranged to directly change the signal projecting direction and the position of the imaging lens. The projecting direction is obtained in the form of a digital signal from the printed pattern board which is arranged to rotate together with one of the rotating cams. Meanwhile, the extent of displacement of the imaging lens is also obtained in the form of a digital signal from a printed pattern board which is arranged to rotate together with the other rotating cam. Then, the imaging lens driving cam is rotated until the two signals come to satisfy a predetermined relation. This arrangement according to the invention gives the following advantages:

(1) A high degree of focusing accuracy is necessary when having an imaging lens displaced directly in the direction of the optical axis. However, in accordance with the invention, this is effected through a digital signal to prevent noises from being mixing in, so that a high degree of accuracy can be obtained.

(2) The direction in which the signal is projected toward an object and the extent to which the imaging lens is displaced are regulated by the rotating cams, so that a high degree of reliability can be obtained with simple structure.

(3) Both the information on the above stated signal projecting direction and the information on the extent of displacement of the imaging lens are obtained from the printed pattern boards which rotate together with the above stated cams. This permits simplification of the structural arrangement.

(4) The rotation phase of each of the above stated rotating cam members is divided into a plurality of sampling intervals. Also, the sampling intervals are arranged such that the distance information value corresponding to each sampling value obtained from the rotating phase of the cam rotating for displacing the imaging lens, is included in the depth of field covered by the distance information value corresponding to the cam lift within the sampling interval. Therefore, despite an arrangement to detect the phase of the cam displacing the imaging lens in a dispersive manner, the fear of producing an out-of-focus adjustment is eliminated.

What is claimed is:

1. A motion picture camera with an automatic focusing device, comprising:
 (a) a signal source capable of projecting an energy flux toward an object to be photographed, the direction in which said energy flux is projected being arranged to be continuously variable;

(b) a first rotatable cam member arranged to continuously vary the projecting direction of said signal source in accordance with the rotating phase of said first rotatable cam member;

(c) a second rotatable cam member and a motor for rotatably driving said second cam member, said second rotatable cam member being arranged to directly displace a photograph taking lens in direction of the optical axis of the lens in accordance with the rotating phase of said second cam member;

(d) first rotating phase detecting means being arranged to detect the rotating phase of said first rotatable cam member and to provide a corresponding output;

(e) second rotating phase detecting means being arranged to detect the rotating phase of said second rotatable cam member and to provide a corresponding output;

(f) signal receiving means for receiving the signal projected from said signal source and for providing a corresponding output; and (g) control circuit means which compares the output of said first rotating phase detecting means with the output of said second rotating phase detecting means when a predetermined output of said signal receiving means is provided, said control circuit means being arranged to control said motor to cause said two outputs of said first and second rotating phase detecting means to satisfy a predetermined relation to each other.

2. A motion picture camera according to claim 1, wherein said first and second rotating phase detecting means comprise functional resistors, rotating members arranged to rotate together with said first and second rotating cam members and on which said functional resistors are formed, and contact members which are arranged to come into sliding contact with said functional resistors respectively; and said functional resistors are arranged to have the resistance values provided across said contact members changed in accordance with the rotating phases of said rotating members.

3. A motion picture camera according to claim 1, wherein said first and second rotating phase detecting means are arranged to rotate together with said first and second rotatable cam members respectively, each of the rotating phase detecting means comprising a printed circuit board including a plurality of pattern electrodes arranged on a corresponding one of said rotatable cam members and a contact member for sliding contact with said pattern electrodes.

4. A motion picture camera according to claim 3, wherein the outputs of each of said first and second rotating phase detecting means are dispersively arranged in one-to-one corresponding relation to a plurality of sampling intervals successively defined over the range of rotation of each of the first and second rotatable cam members.

5. A motion picture camera according to claim 4, wherein a distance to an object to be photographed corresponding to each sampling interval on the second rotatable cam member is also included within the range of depth of field covered by another sampling interval adjacent thereto.

6. A motion picture camera according to claim 4, wherein the outputs of said first and second rotating phase detecting means obtained at each of said sampling intervals are in the form of a digital code.

* * * * *